(12) United States Patent
Jun et al.

(10) Patent No.: US 8,311,413 B2
(45) Date of Patent: Nov. 13, 2012

(54) HIGH POWER EFFICIENCY OPTICAL-WIRELESS TRANSMITTER

(75) Inventors: Yong-Il Jun, Deajeon (KR); Wang-Joo Lee, Daejeon (KR); Tae-Joon Park, Daejeon (KR); Young-Boo Kim, Gongju (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 533 days.

(21) Appl. No.: 12/532,521

(22) PCT Filed: Mar. 21, 2008

(86) PCT No.: PCT/KR2008/001620
§ 371 (c)(1),
(2), (4) Date: Oct. 26, 2009

(87) PCT Pub. No.: WO2008/115034
PCT Pub. Date: Sep. 25, 2008

(65) Prior Publication Data
US 2010/0092180 A1  Apr. 15, 2010

(30) Foreign Application Priority Data

Mar. 22, 2007 (KR) .................. 10-2007-0028241

(51) Int. Cl.
*H04B 10/00* (2006.01)
*H04B 14/04* (2006.01)
*H04L 27/00* (2006.01)
(52) U.S. Cl. ................ 398/118; 375/295; 375/242
(58) Field of Classification Search ........... 398/118; 375/295, 242
See application file for complete search history.

(56) References Cited

U.S. PATENT DOCUMENTS 5,077,793 A * 12/1991 Falk et al. ............ 380/28
(Continued)

FOREIGN PATENT DOCUMENTS

JP       9-93196       4/1997
(Continued)

OTHER PUBLICATIONS

Demuth et al; Algorithms for defining Mixed Radix FFT flow graphs; Sep. 1989; IEEE transactions on acoustics, speech, and signal processing, vol. 37. No. 9; Seepage 1349-1358.*

*Primary Examiner* — Kenneth N Vanderpuye
*Assistant Examiner* — Amritbir Sandhu
(74) *Attorney, Agent, or Firm* — Nelson Mullins Riley & Scarborough LLP; EuiHoon Lee, Esq.

(57) ABSTRACT

Provided is a high power efficiency optical-wireless transmitter capable of solving problems of low power efficiency, signal distortion due to non-linearity of output, large number of connection terminals, and non-uniformity of optical power intensities of optical sources. The high power efficiency optical wireless transmitter includes: an amplitude-to-array coder converting an amplitude of an electric signal input from a baseband modulator into optical source control signals so as to generate an optical output power corresponding to the electric signal; optical source driver groups driving optical sources based on the optical source control signals of the amplitude-to-array coder; and MMRS (modified mixed radix system) or MMRR (modified mixed radix system with Redundancy) optical source group driven by the optical source driver groups to generate various optical power intensities.

15 Claims, 9 Drawing Sheets

U.S. PATENT DOCUMENTS

| | | |
|---|---|---|
| 6,201,822 B1 * | 3/2001 | Okayasu .................... 372/38.04 |
| 7,583,642 B2 * | 9/2009 | Rumpf et al. ................. 370/338 |
| 7,583,896 B2 * | 9/2009 | Taniguchi et al. .............. 398/72 |
| 7,602,316 B2 * | 10/2009 | Monro ............................ 341/50 |
| 7,885,547 B2 * | 2/2011 | Nakaso et al. ................ 398/130 |
| 2002/0122231 A1 * | 9/2002 | Verbana et al. ............... 359/145 |
| 2005/0020278 A1 * | 1/2005 | Krumm et al. .............. 455/456.1 |
| 2006/0056855 A1 | 3/2006 | Nakagawa et al. |
| 2007/0081163 A1 * | 4/2007 | Liang et al. ................... 356/445 |
| 2009/0015442 A1 * | 1/2009 | Monro ............................ 341/51 |
| 2009/0063604 A1 * | 3/2009 | Tan ............................... 708/404 |
| 2009/0219180 A1 * | 9/2009 | Monro ............................ 341/83 |
| 2009/0313314 A1 * | 12/2009 | Mundarath et al. ........... 708/405 |
| 2011/0150061 A1 * | 6/2011 | Winzer ......................... 375/224 |
| 2011/0228758 A1 * | 9/2011 | Hammarwall et al. ....... 370/344 |

FOREIGN PATENT DOCUMENTS

| | | |
|---|---|---|
| JP | 10-242912 | 9/1998 |
| JP | 2005-236667 | 9/2005 |
| JP | 2006-93879 | 4/2006 |
| JP | 2006-94015 | 4/2006 |
| WO | WO-2005048492 A1 | 5/2005 |
| WO | WO-2008/115034 A1 | 9/2008 |

* cited by examiner

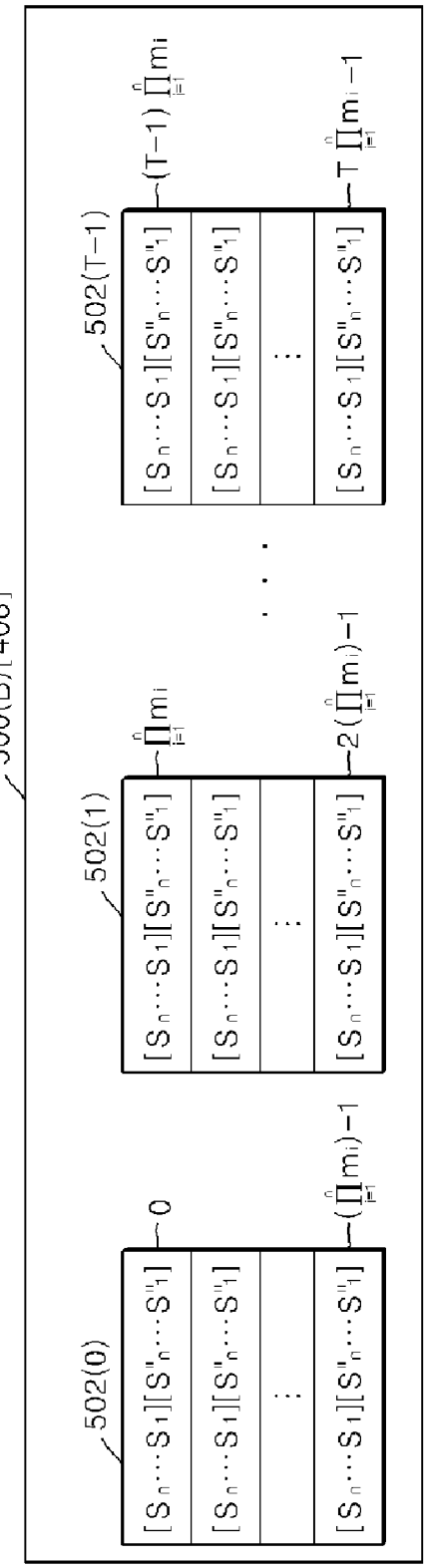

HIGH POWER EFFICIENCY OPTICAL-WIRELESS TRANSMITTER

RELATED APPLICATIONS

This application is a 35 U.S.C. §371 national stage filing of PCT Application No. PCT/KR2008/001620 filed on Mar. 21, 2008, which claims priority to, and the benefit of, Korean Patent Application No. 10-2007-0028241 filed on Mar. 22, 2007. The contents of the aforementioned applications are hereby incorporated by reference.

TECHNICAL FIELD

The present invention relates to an optical communication apparatus, and more particularly, to an optical wireless transmitter capable of transmitting optical signals with high power efficiency.

BACKGROUND ART

Recently, the advancements of information technology (IT) have lead to the development of ubiquitous communication environments wherein various services can be provided between any types of apparatuses regardless of time and place. In addition, in a ubiquitous communication network, the use of wireless communication for connecting to different terminals has gradually increased due to advantages such as codeless operability and mobility.

In currently-used wireless communication technologies, RF/MW frequency bands vary from several MHz to tens of GHz, and a relatively low service rate is used in comparison with wired communication technologies. In addition, in wireless communication technologies, frequency sharing is needed among user terminals, satellites, and military networks. Also, problems such as information security and electromagnetic interference (EMI) harmful to human bodies need to be addressed.

As a promising technology for addressing the problems of the conventional wireless communication, there has been proposed an optical-wireless communication technology in which information is communicated using light propagating through a space.

According to current research results, an intensity modulation (IM)/direct detection (DD) optical-wireless communication technology can provide an inexpensive practical optical modulation scheme for indoor optical-wireless communication.

FIG. 1 is a conceptual view illustrating a conventional IM/DD optical-wireless communication apparatus.

Operations of the conventional optical-wireless communication apparatus are described in brief with reference to FIG. 1. An input electrical signal is converted into line codes suitable for optical channels by a modulator 10 and amplified into a suitable current signal by an amplifier. A light emitting device 20 such as a laser diode (LD) or a light emitting diode (LED) output an optical signal (optical channel) by using the current signal. The optical signal is detected by a photo diode (PD) 30 and converted into an optical current signal. The optical current signal is demodulated by a demodulator 40 and output to a receiver.

The modulation performed by the modulator 10 is classified into time-domain modulation and frequency-domain modulation. In the time-domain modulation, a non-return-to-zero (NRZ) or return-to-zero (RZ) code on-off keying scheme for modulating a transmission signal by using an on-off characteristic of a signal intensity and a pulse position modulation scheme for modulating the transmission signal by using a time difference between pulses are used. The frequency-domain modulation is performed by using one subcarrier or a plurality of subcarriers.

As a frequency-domain modulation scheme, orthogonal frequency division multiplexing (OFDM) is used. OFDM is widely used for wire/wireless communication such as x-digital subscriber line (xDSL), wireless local area network (LAN), and wireless Internet in which signal interference due to a multi-path has to be addressed. OFDM has advantages of easy implementation and easy frequency-band management.

In OFDM, an output signal has a large peek-to-average power ratio (PAPR). Therefore, an operating efficiency of a power amplifier at the output stage is lowered, and communication performance is deteriorated due to signal deformation caused by non-linearity of the power amplifier. Therefore, in IM optical-wireless communication using OFDM, due to a high PAPR, the power efficiency of the optical-wireless transmitter is lowered and nonlinear signal deformation occurs.

These problems are described in detail below with reference to FIG. 2.

FIG. 2 is a schematic block diagram illustrating a conventional IM optical-wireless transmitter.

Operations of the optical-wireless transmitter are described with reference to FIG. 2. An input electrical signal is modulated by a baseband modulator 201. The output signal of the baseband modulator 201 is a digital signal. The digital signal is converted into an analog signal by a digital-to-analog (DA) converter 202. The analog signal is amplified by a power amplifier 203. An LD or LED 204 is driven by the amplified signal to generate an optical-power signal in proportion to the output signal of the power amplifier 203.

As described above, in a case where the OFDM scheme is used for the baseband modulator 201, the output signal of the baseband modulator 201 has a high PAPR characteristic. Therefore, in order to linearly amplify the output signal, the power amplifier 203 needs to be implemented with class-A bias state. In general, a maximum power efficiency of the class-A amplifier is limited to 50% or less. The power efficiency of an amplifier is inversely proportional to the PAPR of the input signal. For example, if the PAPR is 10 dB, the power efficiency of the power amplifier 203 is about 5%.

A signal having a high PAPR characteristic undergoes signal deformation caused by the non-linearity of the power amplifier. In order to prevent the signal deformation, the power amplifier 203 need to have output power capacity larger by 10 dB~20 dB than an average system power. According to our research results, an optical-wireless transmitter for 1 Gb/s~3 Gb/s indoor optical-wireless communication needs to have an average optical power of 1 W. Such a high power optical-wireless transmitter is higher by 40 dB than typical 0.1 mW optical-wireless transmitter for ultra wide bandwidth (UWB) communication.

Therefore, if the 1 W optical-wireless transmitter is implemented by using conventional technologies, the power amplifier 203 needs to be implemented to have a maximum output power of 20 W to 40 W assuming 50% electrical-optical conversion efficiency of the LD/LED. In other words, a competitive 1 W optical-wireless transmitter cannot be implemented by using the conventional technologies.

This problem of high power consumption of the power amplifiers 203 has to be addressed for the competitiveness of the optical-wireless communication technology with respect to UWB technologies or 802.11n technologies. As a practical method, a large number of LDs or LEDs can be used to generate a 1 W optical signal while maintaining a high modulation rate (Gb/s). However, when the LDs such as vertical cavity surface emitting laser (VCSEL) diodes are operated with a high current, non-uniformity of the optical power intensities of the LDs occurs due to a difference of cooling structures of LD arrays. Therefore, an optical-wireless transmitter using a larger number of LDs needs to cope with the non-uniformity of the optical power intensities of the LDs.

In case of using a large number of LDs or LEDs, a larger number of drivers are also needed to drive the LDs or LEDs. In general, the drivers are made of different materials compared to the optical elements. Therefore, two devices separately formed must be connected to each other. However, for the connection between the two devices, a larger number of connection wires are needed. Thus, in order to implement an inexpensive optical-wireless transmitter, the number of connection wires between the drivers and the LDs or LEDs should be reduced.

DISCLOSURE OF INVENTION

Technical Problem

The present invention provides a high power efficiency optical-wireless transmitter that addresses problems of low power efficiency, signal distortion due to non-linearity of output, large number of connection terminals, and non-uniformity of optical intensities of optical sources.

Technical Solution

According to an aspect of the present invention, there is provided a high power efficiency optical wireless transmitter comprising: an amplitude-to-array coder converting an amplitude of an electric signal input from a baseband modulator into optical source control signals so as to generate the optical power corresponding to the electric signal; optical source driver groups driving optical sources based on the optical source control signals of the amplitude-to-array coder; and MMRS (modified mixed radix system) or MMRR (modified mixed radix system with Redundancy) optical-source group driven by the optical source driver groups to generate various optical power intensities.

In the above aspect of the present invention, the MMRS optical-source group can include n optical source groups, wherein a first optical source group of the n optical source groups includes $m_1-1$ first unit optical sources, and the relative optical power intensity of the first unit optical sources is 1, wherein a second optical source group of the n optical source groups includes $m_2-1$ second unit optical sources, and the relative optical power intensity of the second unit optical sources is $m_1$, wherein a k-th optical source group of the n optical source groups includes $m_k-1$ k-th unit optical sources, and the relative optical power intensity of the k-th unit optical sources is $$\prod_{i=1}^{k-1} m_i,$$

wherein an n-th optical source group of the n optical source groups includes $m_n-1$ n-th unit optical sources, and a relative optical power intensity of the n-th unit optical sources is $$\prod_{i=1}^{n-1} m_i,$$

and wherein n, $m_1$, $m_2$, $m_k$, and $m_n$ are arbitrary natural numbers, and the MMRS optical source group generates the optical power intensities having arbitrary integers ranging from 0 to $$\left(\prod_{i=1}^{n} m_i - 1\right)$$

by controlling on-off of the unit optical sources.

In addition, the MMRR optical source group can include n optical source groups, wherein a first optical source group of the n optical source groups includes $m_1+\alpha_1-1$ first unit optical sources, and the relative optical power intensity of the first unit optical sources is 1, wherein a second optical source group of the n optical source groups includes $m_2+\alpha_2-1$ second unit optical sources, and the relative optical power intensity of the second unit optical sources is $m_1$, wherein a k-th optical source group of the n optical source groups includes $m_k+\alpha_k-1$ k-th unit optical sources, and the relative optical power intensity of the k-th unit optical source is $$\prod_{i=1}^{k-1} m_i,$$

wherein an n-th optical source group of the n optical source groups includes $m_n+\alpha_n-1$ n-th unit optical sources, and the relative optical power intensity of the n-th unit optical sources is $$\prod_{i=1}^{n-1} m_i,$$

and wherein n, $m_1$, $m_2$, $m_k$, $m_n$, $\alpha_1$, $\alpha_2$, $\alpha_k$, and $\alpha_n$ are arbitrary natural numbers, and the MMRR optical source group generates the optical power intensities having arbitrary integers ranging from 0 to $$\left(\prod_{i=1}^{n} m_i - 1\right)$$

by controlling on-off of the unit optical sources.

In addition, the number of connection lines between the MMRS or the MMRR optical source group and drivers driving the MMRS or the MMRR optical source group can be exponentially decreased in comparison with an optical wireless transmitter using individually-driven optical sources. In addition, each unit optical source of each optical source group can be constructed by connecting many LDs or LEDs in parallel, in series, or both in parallel and in series.

In addition, the amplitude-to-array coder 301 or 400 which generates the optical source control signals $(D_n, \ldots, D_1)$ used to drive the MMRS or MMRR optical source group can comprise: n−1 input converters 401 converting the electric signal 307 to an MMRR/MMRS-notation electric signal $(Q_n, \ldots, Q_2, R_1)$; n modulo adders calculating current-period last turn-on boundary position information $(S_n, \ldots, S_1)$ based on digit information $(Q_n, \ldots, Q_2, R_1)$ and last-period last turn-on boundary position information $(S'_n, \ldots, S'_1)$; n registers storing the current-period last turn-on boundary position information; and n decoders generating the optical source control signals used to control the on-off of the unit optical sources based on the current-period last turn-on boundary position information and the last-period last turn-on boundary position information.

In addition, modulo adder 402(k) can calculate the current-period last turn-on boundary position information $(S_k)$ by adding last-period last turn-on boundary position information $(S'_k)$ to the MMRR/MMRS k-th digit information $(Q_k$ or $R_1)$ of the electric signal 307 with modulo $(m_k + \alpha_k - 1)$ addition.

In addition, the amplitude-to-array coder which generates the optical source control signals used to drive the MMRS or MMRR optical source group can comprise: n−1 input converters converting the electric signal to an MMRS-notation electric signal; n modulo adders calculating current-period last turn-on boundary position information $(S_n, \ldots, S_1)$ based on digit information $(Q_n, \ldots, Q_2, R_1)$ and current-period first turn-on boundary position information $(S'_n, \ldots, S'_1)$; n random number generators 405 generating the current-period first turn-on boundary position information; n decoders generating the optical source control signals used to control the on-off of the unit optical sources based on the current-period last turn-on boundary position information and the current-period first turn-on boundary position information.

In addition, each modulo adder can calculate the current-period last turn-on boundary position information by using a modulo addition method, wherein the modulo addition method can be a method of adding current-period first turn-on boundary position information $(S'_k)$ to the digit information $(Q_k$ or $R_1)$ of the electric signal, diving the result by the number $(m_k + \alpha_k - 1)$ of unit optical sources of each digit to obtain a remainder, and inputting the remainder to the current-period last turn-on boundary position information $(S_k)$.

In addition, the amplitude-to-array coder which generates the optical source control signals used to drive the MMRS or MMRR optical source group can comprise: a lookup unit outputting current-period last turn-on boundary position information $(S_n, \ldots, S_1)$ previously stored in an information storage designated by the electrical signal and last-period last turn-on boundary position information $(S'_n, \ldots, S'_1)$; n registers storing the current-period last turn-on boundary position information; and n decoders generating the optical source control signals used to control the on-off of the unit optical sources based on the current-period last turn-on boundary position information and the last-period last turn-on boundary position information.

In addition, the number of lookup memory pages of the lookup unit can be determined by the electrical signal and the number of optical sources, wherein a memory space of each lookup memory page is determined by a dynamic range of the electrical signal, and wherein each lookup memory page has $$\prod_{i=1}^{n} m_i$$

rows, and each row stores the current-period last turn-on boundary position information $(S_n, \ldots, S_1)$. In addition, the lookup unit can output optimal current-period last turn-on boundary position information $(S_n, \ldots, S_1)$ which takes care of driving power voltage information of the optical source drivers and temperature information of the optical source groups. In addition, the driving power voltage information can be fixed when the high power efficiency optical-wireless transmitter is initiated, and the temperature information of the optical source groups can be stored in an auxiliary memory apparatus and loaded on the lookup unit when an operating temperature is changed.

In addition, the amplitude-to-array coder which generates the optical source control signals used to drive the MMRS or MMRR optical source group can comprise: a random number generator generating signals $(0 \sim T-1)$ determining a lookup starting position; a lookup unit outputting current-period last turn-on boundary position information $(S_n, \ldots, S_1)$ and current-period last turn-on boundary position information $(S''_n, \ldots, S''_1)$ previously stored in an information storage designated by the electrical signal and the signals $(0 \sim T-1)$ determining the lookup starting position; and n decoders generating the optical source control signals used to control the on-off of the unit optical sources based on the current-period last turn-on boundary position information and the current-period first turn-on boundary position information.

In addition, the number of lookup memory pages of the lookup unit can be T, wherein a memory space of each lookup memory page is determined by a dynamic range of the electrical signal, and wherein each lookup memory page has $$\prod_{i=1}^{n} m_i$$

rows, and each row stores the current-period last turn-on boundary position information $(S_n, \ldots, S_1)$ and the current-period last turn-on boundary position information $(S''_n, \ldots, S''_1)$.

In addition, the random number generators can be replaced with an apparatus such as a counter generating signals $(0 \sim T-1)$ determining a lookup starting position and equally outputting an integer ranging from 1 to T−1.

According to the high power efficiency optical-wireless transmitter of the present invention, in comparison with a conventional optical-wireless transmitter, a smaller number of connection terminals and lines between drivers and optical sources are provided, and an arbitrary-level optical output power can be obtained with high power efficiency. In addition, even in case of using optical sources having non-uniform optical power intensities, an optical-wireless having a linear operation characteristic can be implemented.

Advantageous Effects

In an optical-wireless transmitter according to the present invention, a large number of optical sources and drivers can be connected by using a small number of connection terminals and lines, so that it is possible to implement an inexpensive optical-wireless transmitter having a simple structure.

In addition, in an optical-wireless transmitter according to the present invention, an arbitrary analog optical power can be generated by only turning on and off optical sources having various optical power intensities, so that it is possible to implement a high-power efficiency optical-wireless transmitter.

In addition, according to the present invention, even in case of using a plurality of optical sources having non-uniform optical power characteristics, it is possible to implement an optical-wireless transmitter having a linear operation characteristic.

DESCRIPTION OF DRAWINGS

The above and other features and advantages of the present invention will become more apparent by describing in detail exemplary embodiments thereof with reference to the attached drawings in which:

FIGS. 5A and 5B are views illustrating configurations of memory maps of lookup units of FIGS. 4C and 4D, according to an embodiment of the present invention.

BEST MODE

Figure 1:
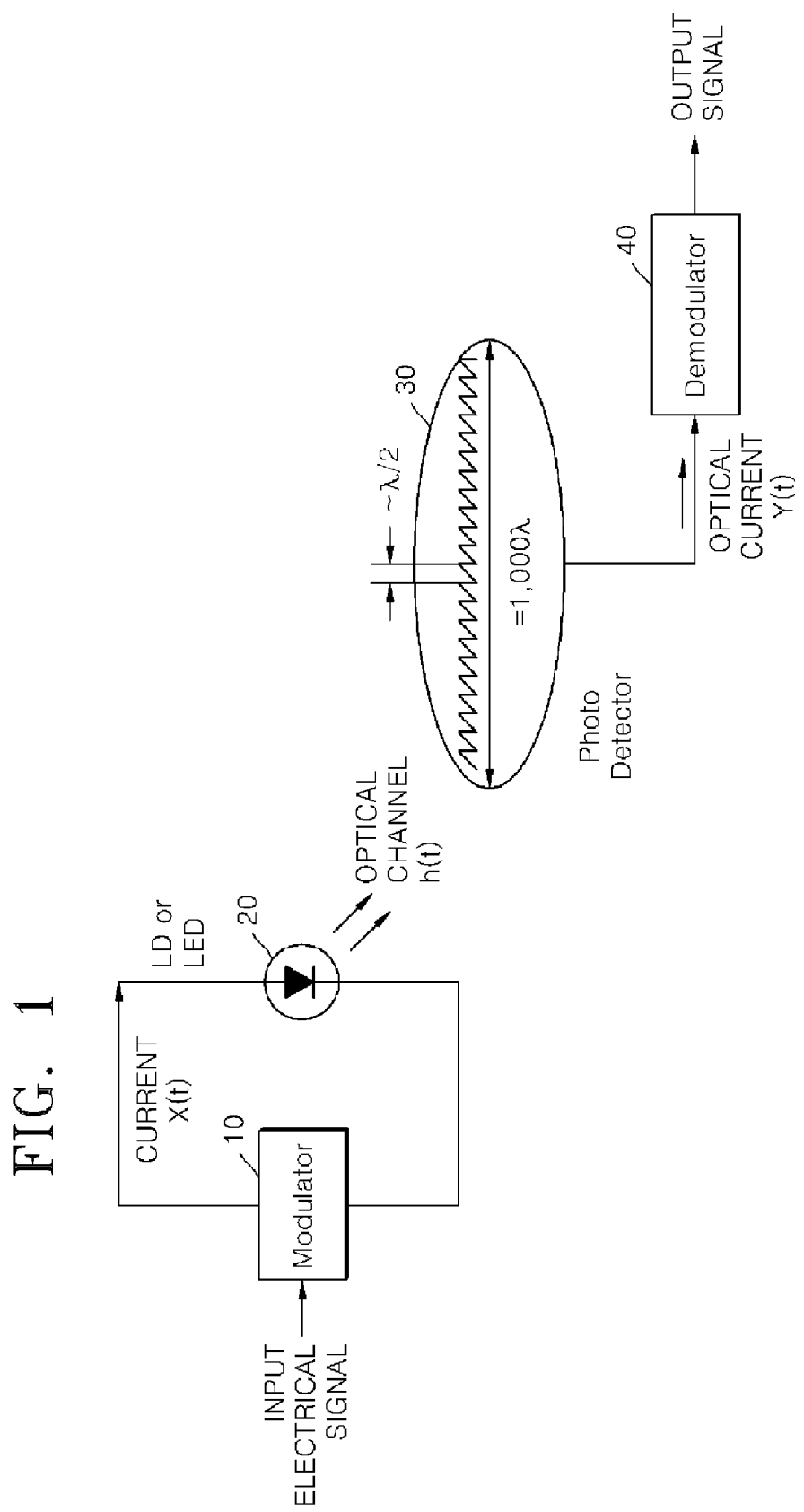
FIG. 1 is a conceptual view illustrating a conventional intensity modulation (IM)/direct detection (DD) optical wireless communication apparatus.

Hereinafter, the present invention will be described in detail by explaining exemplary embodiments of the invention with reference to the attached drawings. Like reference numerals in the drawings denote like elements. In the specification, various terms are used for the purpose of describing the present invention, and are not intended to limit the scope of the present invention as defined by the claims.

[MMRS Notation]

Figure 2:
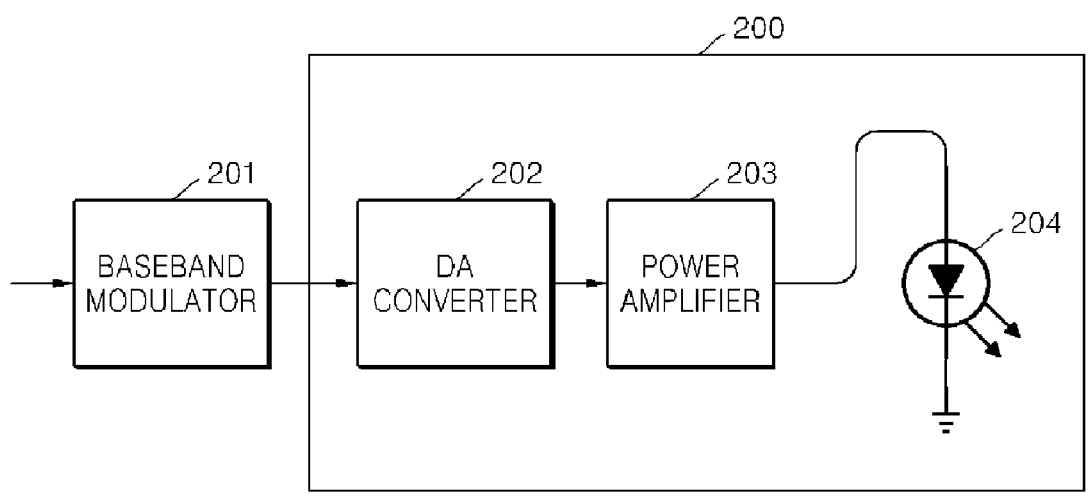
FIG. 2 is a schematic block diagram illustrating a conventional IM optical-wireless transmitter.
Figure 3:
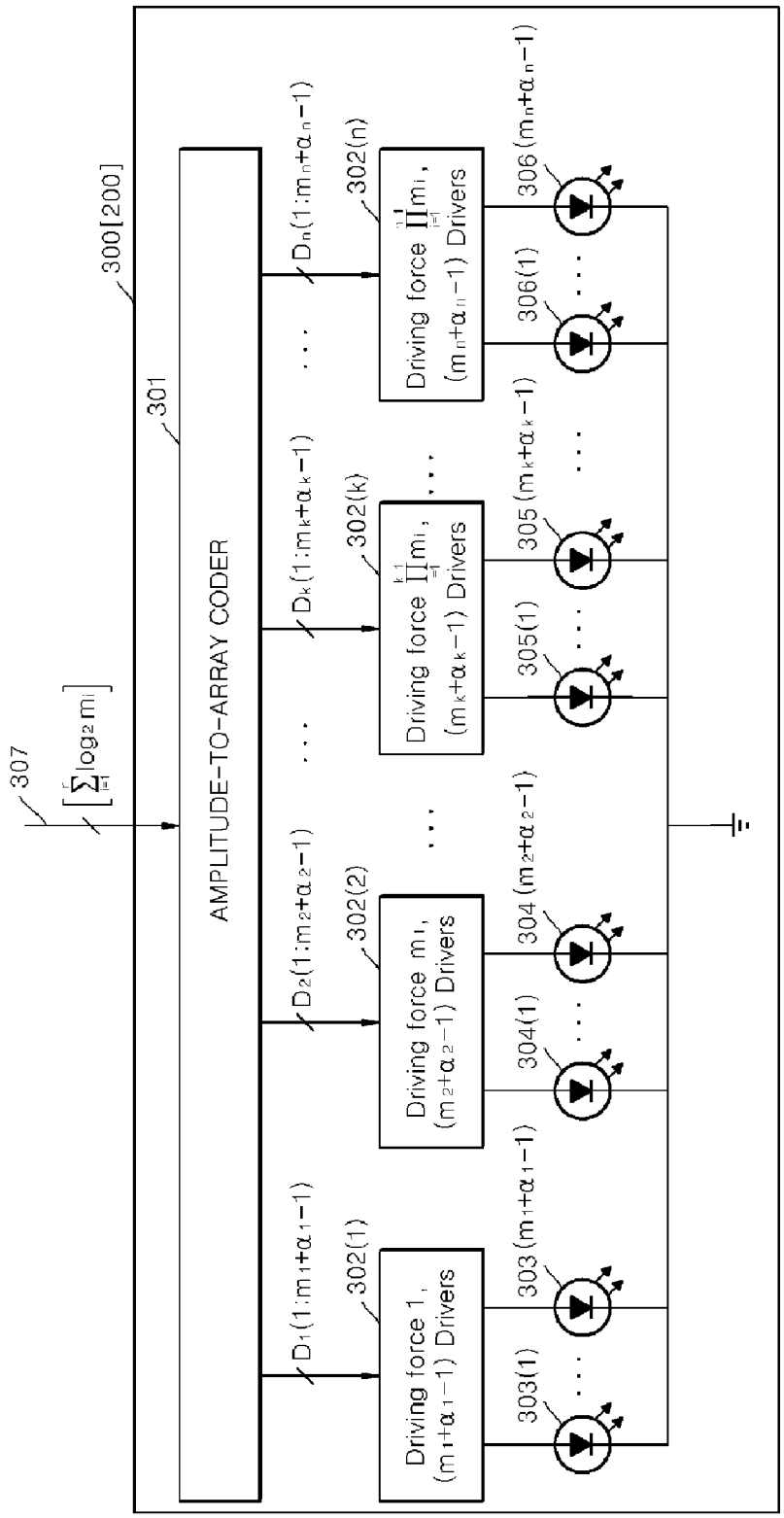
FIG. 3 is a view illustrating the structure of a high power efficiency optical-wireless transmitter according to an embodiment of the present invention.

An output of the baseband modulator 201 of FIG. 2, that is, an input signal 307 of FIG. 3 can be denoted by an arbitrary natural number X, which can be expressed by Equation 1. In Equation 1, $a_k$ denotes a k-th digit, and $b_{k-1}$ denotes a k-th weight number. In a general mixed radix (MR) notation, only the digits up to the maximum digit less by 1 than the weight number can be used. However, if the (k+1)-th weight number satisfies the condition of $$\prod_{i=1}^{k} m_i$$

in Equation 1, that is, if the (k+1)-th weight number is set based on the k-th maximum digit, an arbitrary natural number satisfying the condition can be used for any digit. Therefore, the radix-system notation expressed by Equation 1 is referred to as a modified mixed radix system (MMRS) notation.

Now, characteristics of the MMRS notation are described in detail. For all k, if $m_k=2$, Equation 1 becomes a binary-system notation for natural numbers. For all k, if $m_k=10$, Equation 1 becomes a decimal-system notation for natural numbers. If $m_1=10$ and $m_2=2$, the first term expresses the decimal-system notation having a weight number of 1, and the second term expresses the binary-system notation having a weight number of 10.

$$X = a_1 + a_2 b_1 + a_3 b_2 + \ldots + a_k b_{k-1}^- \quad \text{[Equation 1]}$$

Here, $$0 \le a_k < m_k, \; b_{k-1}^- = \prod_{i=1}^{k-1} m_i,$$

$m_k$ is an arbitrary natural number, and k=1, 2, 3, ... n.

A dynamic range of the input electrical signal 307 of FIG. 3, that is, a natural number range that can be expressed by Equation 1 is expressed by Equation 2. All natural numbers in the dynamic range are uniquely determined in Equation 1. Namely, the input electrical signals 307 having the same amplitude can be uniquely expressed by Equation 1.

$$0 \le X < \prod_{i=1}^{n} m_i \quad \text{[Equation 2]}$$

[MMRS Optical Source Group]

An operation of generating an optical output power corresponding to the input electrical signal 307 is the same as an operation of converting the input electrical signal 307 into an MMRS-notation input electrical signal X. Namely, an electrical-optical conversion operation for the input electrical signal X 307 is the same as an operation of converting the input electrical signal X into the MMRS-notation input signal of Equation 1, corresponding the weight numbers 1, $b_1$, $b_2$, ..., $b_{n-1}$ of the converted MMRS-notation input signal X to relative optical power intensities 1, $m_1$, $m_2 m_1$, ..., $$\prod_{i=1}^{k-1} m_i, \ldots, \prod_{i=1}^{n-1} m_i$$

of the optical sources, corresponding the digit numbers $a_1$, $a_2$, ..., $a_k$, ... $a_n$ of the MMRS-notation input signal X to the number of optical sources per weight number, and turning on the corresponding optical sources.

If the dynamic range of the input electrical signal X 307 satisfies Equation 2, the minimum numbers of optical sources required for the electrical-optical conversion for all values of the input signal X are $(m_1-1), (m_2-1), \ldots, (m_k-1), \ldots,$ and $(m_n-1)$ for the corresponding digit numbers. The optical source group constructed according to the MMRS notation is referred to as an MMRS optical source group. Namely, the MMRS optical source group is constructed with optical sources having the relative optical power intensities 1, $m_1$, $m_2 m_1$, ..., $$\prod_{i=1}^{k-1} m_i, \ldots, \text{and} \prod_{i=1}^{n-1} m_i$$

that are the weight numbers of the MMRS-notation input signal X, wherein the numbers of optical sources corresponding to the optical power intensities are $(m_1-1), (m_2-1), \ldots, (m_k-1), \ldots,$ and $(m_n-1)$.

The MMRS optical source group and drivers for the MMRS optical source group is connected with $$\sum_{i=1}^{n}(m_i-1)$$

connection lines. However, in a case where the MMRS optical source group is constructed with unit optical sources having the same optical power intensity, that is, the relative optical power intensity of 1, the number of necessary connection lines is $$\prod_{i=1}^{n} m_i - 1.$$

For example, when the $m_1=16$, $m_2=16$, and $m_3=16$ MMRS optical source group is constructed by using optical sources having a dynamic range of 0 to 4095, the total number of connection lines for drivers is 45, and the total number of connection lines for optical source groups constructed with the unit optical sources having the relative optical power intensity of 1 is 4095.

The MMRS optical source group can be connected with a greatly-reduced number of optical source-driver connection lines. In addition, all the optical power intensities in the range of Equation 2 can be generated by controlling only the on-off of the unit optical sources of the MMRS optical source group. Namely, the MMRS optical source group can generate light having an analog power intensity by turning on and off the unit optical sources without using of an analog power amplifier. Accordingly, an inexpensive high-power efficiency optical-wireless transmitter can be implemented by using the MMRS optical source group.

[MMRR Optical Source Group]

The optical power intensities of the unit optical sources of the MMRS optical source group need to have weight numbers 1, $m_1$, $m_2 m_1$, ..., $$\prod_{i=1}^{k-1} m_i, \ldots, \text{ and } \prod_{i=1}^{n-1} m_i$$

in the MMRS notation. However, due to non-uniformity of processes for producing the unit optical sources it is very difficult to obtain uniformity of optical power intensities of the unit optical sources. As a countermeasure for the non-uniformity of the optical power intensities of the unit optical sources, in a case where the optical power intensity of the unit optical source corresponding to the (k+1) weight number is smaller than the specified value $$\prod_{i=1}^{k} m_i,$$

the decreased amount of the optical power intensity of the optical-wireless transmitter can be compensated by additionally turning on the redundant unit optical sources corresponding to K-th digit. On the contrary, in a case where the optical power intensity of the unit optical source corresponding to the (k+1) weight number is larger than the specified value $$\prod_{i=1}^{k} m_i,$$

the increased amount of the optical power intensity of the optical-wireless transmitter can be compensated by additionally turning off the redundant unit optical sources corresponding to the K-th digit.

In addition, in a case where the unit optical sources of the MMRS optical source group are driven by using a peak-value driving scheme, it is advantageous that the unit optical sources that are turned on once need to be maintained in the turn-off state for a predetermined time interval in view of heat release and electrical-optical conversion efficiency. In order to acquire the predetermined turn-off time interval, a larger number of unit optical sources than the number of unit optical sources for MMRS optical source group are required.

In order to cope with the non-uniformity of optical power intensities of the unit optical sources and acquire the peak-value operability of the unit optical sources, the number of unit optical sources required for the MMRR optical source group is larger than the minimum number $(m_1-1)$, $(m_2-1)$, ..., $(m_k-1)$, ..., or $(m_n-1)$ required for each digit of the MMRS optical source group.

For this reason, if an integer larger by $\alpha_k$ than the k-th maximum digit $m_k-1$ of the MMRS-notation input signal is used, the input electrical signal 307 can be expressed by Equation 3. The radix-system notation expressed by Equation 3 is referred to as a modified mixed radix system with redundancy (MMRR) notation.

$$X = a_1 + a_2 b_1 + a_3 b_2 + \ldots + a_k b_{k-1}^{-} \quad \text{[Equation 3]}$$

Here, $$0 \le a_k < m_k + \alpha_k, \, b_{k-1}^{-} = \prod_{i=1}^{k-1} m_i,$$

$m_k$ and $\alpha_k$ are arbitrary natural numbers, and k=1, 2, 3, ... n.

Similar to the MMRS optical source group, the optical source group implemented according to the MMRR notation is referred to as an MMRR optical source group. Namely, the MMRR optical source group is constructed with optical sources having the relative optical power intensities 1, $m_1$, $m_2 m_1$, ..., $$\prod_{i=1}^{k-1} m_i, \ldots, \text{ and } \prod_{i=1}^{n-1} m_i$$

that are the weight numbers of the MMRR-notation input signal X, wherein the numbers of optical sources corresponding to the optical power intensities are $(m_1+\alpha_1-1)$, $(m_2+\alpha_2-1)$, ..., $(m_k+\alpha_k-1)$, ..., and $(m_n+\alpha_n-1)$. The MMRR optical source group has a function of avoiding the non-uniformity of optical power intensities of the unit optical sources and the peak-value operability of the unit optical source as well as all the characteristics of the MMRS optical source group.

EMBODIMENTS

FIG. 3 is a view illustrating the structure of a high power efficiency optical-wireless transmitter according to an embodiment of the present invention.

Referring to FIG. 3, the high power efficiency optical-wireless transmitter 300 includes: an amplitude-to-array coder 301 converting an amplitude of an input electric signal 307 into optical source control signals corresponding to array of to-be-driven optical sources; a optical source driver group 302 having various driving forces; and MMRR optical source groups 303 to 306 having various optical power intensities.

More specifically, the optical-wireless transmitter 300 includes the amplitude-to-array coder 301 converting the electrical signal input 307 from a baseband modulator into optical source on-off control signals $D_1(1:m_1+\alpha_1-1)$ to $D_n(1:m_n+\alpha_n-1)$; optical source driver groups 302(1) to 302(n) having relative driving forces of 1 to $$\prod_{i=1}^{n-1} m_i$$

and driving on-off of the MMRR optical source group 303 to 306, controlled by the output signals $D_1(1:m_1+\alpha_1-1)$ to $D_n(1:m_n+\alpha_n-1)$ of the amplitude-to-array coder 301; and the MMRR optical source group 303 to 306 having relative optical power intensities of 1 to $$\prod_{i=1}^{n-1} m_i$$

driven by the optical source driver groups 302(1) to 302(n) to generate the optical power intensities ranging from 0 (minimum) to $$\prod_{i=1}^{n} m_i + \sum_{k=1}^{n} \alpha_k \prod_{i=1}^{k-1} m_i - 1 \text{ (maximum)}.$$

The first optical source driver 302(1) is constructed with $m_1+\alpha_1-1$ drivers driving on-off of the optical sources 303(1) to $303(m_1+\alpha_1-1)$ with a relative driving force of 1 based on $m_1+\alpha_1-1$ optical source on-off control signals $D_1(1:m_1+\alpha_1-1)$. The second optical source driver 302(2) is constructed with $m_2+\alpha_2-1$ drivers driving on-off of the optical sources 304(1) to $304(m_2+\alpha_2-1)$ with a relative driving force of $m_1$ based on $m_2+\alpha_2-1$ optical source on-off control signals $D_2(1:m_2+\alpha_2-1)$. For an arbitrary integer k between 3 to (n−1), the k-th optical source driver 302(k) is constructed with $m_k+\alpha_k-1$ drivers driving on-off of the optical sources 305(1) to $305(m_k+\alpha_k-1)$ with a relative driving force of $$\prod_{i=1}^{k-1} m_i$$

based on $m_k+\alpha_k-1$ optical source on-off control signals $D_k(1:m_k+\alpha_k-1)$. Finally, the n-th optical source driver 302(n) is constructed with $m_n+\alpha_n-1$ drivers driving on-off of the optical sources 306(1) to $306(m_n+\alpha_n-1)$ with a relative driving force of $$\prod_{i=1}^{n-1} m_i$$

based on $m_n+\alpha_n-1$ optical source on-off control signals $D_n(1:m_n+\alpha_n-1)$.

Each of the MMRR optical source groups 303 to 306 can be constructed by a suitable number of light emitting devices such as LDs and LEDs in parallel, in series, or in parallel and in series.

According to the present invention, optical signals for wireless communication can be generated by controlling only on-off driving of the unit optical sources having various optical power intensities. In this case, power consumption for charging and discharging in parasitic capacitors of the optical-wireless transmitter becomes main power loss of the optical source driver groups 302(1) to 302(n).

In addition, according to the present invention, the unit optical sources having various optical power intensities are used in combination thereof, so that the number of connection terminals and lines between the MMRR optical source groups 303(1) to $306(m_n+\alpha_n-1)$ and the optical source driver groups 302(1) to 302(n) can be exponentially decreased in comparison with the convention optical-wireless transmitter using optical sources having one optical power intensity.

Structures and operations of various amplitude-to-array coders used as the amplitude-to-array coder of FIG. 3 are described in detail.

Figure 4A:
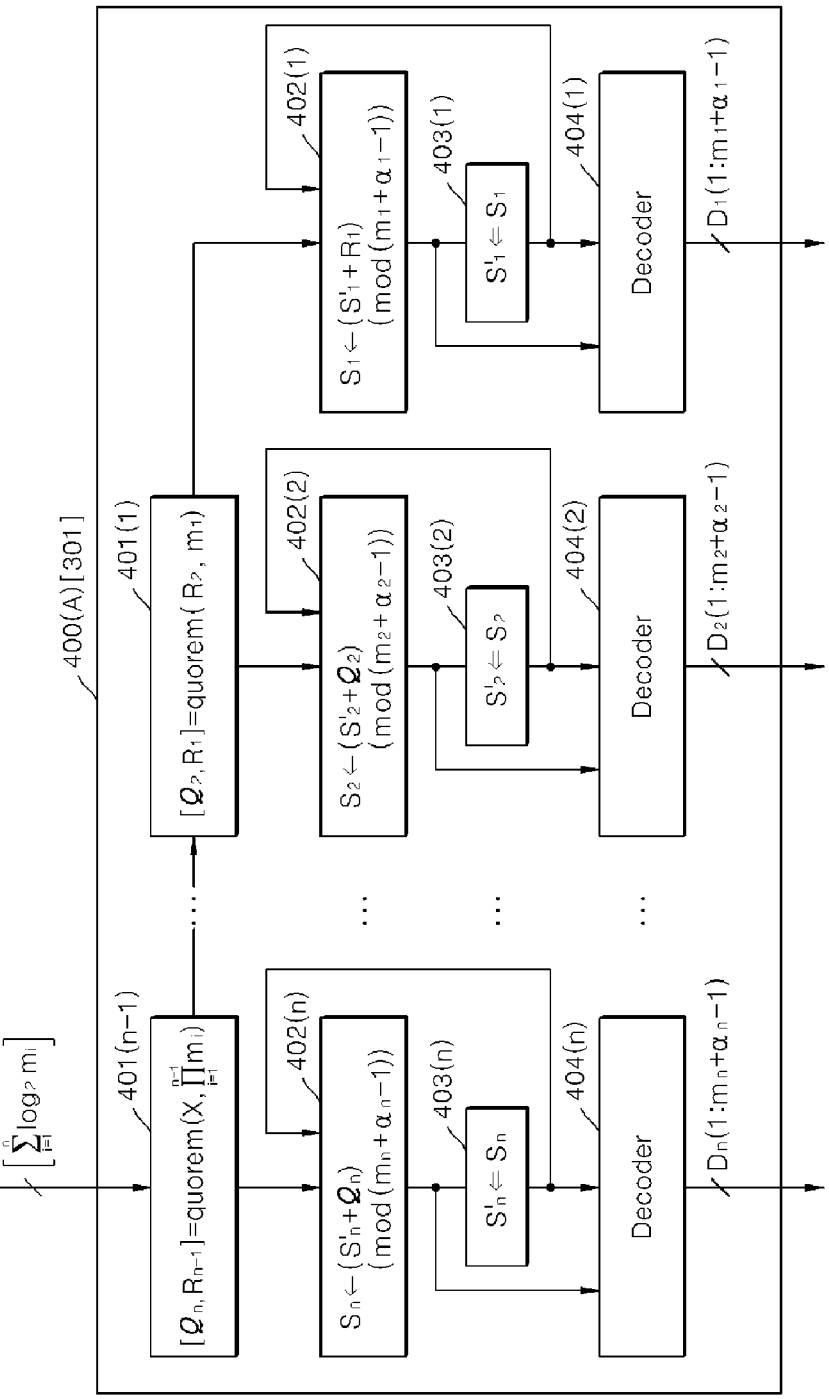
FIGS. 4A to 4D are views illustrating structures of various amplitude-to-array coders used as the amplitude-to-array coder of FIG. 3, according to an embodiment of the present invention.

FIG. 4A is a view illustrating a constructions of a first-type amplitude-to-array coder used as the amplitude-to-array coder of FIG. 3.

Referring to FIG. 4A, the first-type amplitude-to-array coder 400(A) includes n−1 input converters 401(n−1) to 401(1), n modulo adders 402(n) to 402(1), n registers (403(n) to 403(1), and n decoders 404(n) to 404(1).

The (n−1)-th input converter 401(n−1) divides the input electrical signal 307 by the n-th weight number $$\prod_{i=1}^{n-1} m_i$$

of Equation 1 and outputs the quotient and remainder thereof as $Q_n$ and $R_{n-1}$, respectively. The quotient $Q_n$ is input to the n-th modulo adder 402(n), and the remainder $R_{n-1}$ is input to the (n−2)-th input converter 401(n−2). Similarly, the k-th input converter among the 2 to (n−3) divides the remainder $R_{k+1}$ input from the (k+1)-th input converter 401(k+1) by the (k+1)-th weight number $$\prod_{i=1}^{k} m_i$$

of Equation 1 and outputs the quotient and remainder thereof as $Q_{k+1}$ and $R_k$, respectively. The quotient $Q_{k+1}$ is input to the (k+1)-th modulo adder 402(k+1), and the remainder $R_k$ is input to the next (k−1)-th input converter 401(k−1).

Finally, the first input converter 401(1) divides the remainder $R_2$ input from the second input converter 401(2) by the second weight number $m_1$ of Equation 1 and inputs the quotient $Q_2$ and remainder $R_1$ thereof to the second modulo adder 402(2) and the first modulo adder 402(1), respectively.

For an arbitrary integer k between 1 and (n−1), the resulting k-nth quotient $Q_k+_1$ output from the k-th input converter among the n−1 input converters 401(n−1) to 401(1) corresponds to the k-th digit $a_k$, and the remainder $R_1$ of the first input converter 401(1) corresponds to the first digit $a_1$. As a result, the input electrical signal 307 is converted into the MMRS-notation input electrical signal by the n−1 input converters 401(n−1) to 401(1). The digits of the MMRS-notation input electrical signal are input to the n modulo adders 402(n) to 402(1).

The n-th modulo adder 402(n) generates new current-period last turn-on boundary position information $S_n$ based on the quotient $Q_n$ of the (n−1)-th input converter 401(n−1) and the last-period last turn-on boundary position information $S'_n$ of the optical source group 306 having a relative optical power intensity $$\prod_{i=1}^{n-1} m_i,$$

weight number $$\prod_{i=1}^{n-1} m_i$$

by using a modulo $(m_n+\alpha_n-1)$ addition.

The newly-generated current-period last turn-on boundary position information $S_n$ and the last-period last turn-on boundary position information $S'_n$ stored in the register 403 (n) are input to the decoder 404(n) so as to generate the optical source on-off control signals $D_n(1:m_n+\alpha_n-1)$ of the optical source group 306 having the weight number of $$\prod_{i=1}^{n-1} m_i.$$

The modulo $(m_n+\alpha_n-1)$ addition is a process for dividing the $Q_n+S'_n$ by the $m_n+\alpha_n-1$ to obtain a remainder and outputting the remainder. The number $m_n+\alpha_n-1$ denotes the number of optical sources which has a relative optical power intensity $$\prod_{i=1}^{n-1} m_i.$$

Namely, for the MMRS notation of the input electrical signal 307, the number of optical sources is larger by $\alpha_n$ than the number $m_n-1$ of the optical sources required for the n-th digit. Similarly, for an arbitrary integer k between 1 and (n−2), the k-th modulo adder 402(k) generates new current-period last turn-on boundary position information $S_k$ based on the quotient Q of the (k−1)-th input converter 401(k−1) and the last-period last turn-on boundary position information $S'_k$ of the optical source group having a relative optical power intensity $$\prod_{i=1}^{k-1} m_i,$$

weight number $$\prod_{i=1}^{k-1} m_i$$

by using a modulo $(m_k+\alpha_k-1)$ addition.

The newly-generated current-period last turn-on boundary position information $S_k$ and the last-period last turn-on boundary position information $S'_k$ stored in the register 403 (k) are input to the decoder 404(k) so as to generate the optical source on-off control signals $D_n(1:m_k+\alpha_k-1)$ of the optical source group having the weight number of $$\prod_{i=1}^{k-1} m_i.$$

Finally, the current-period last turn-on boundary position information $S_1$ of the first modulo adder 402(1) and the last-period last turn-on boundary position information $S'_1$ are input to the decoder 404(1) so as to generate the optical source on-off control signals $D_1(1:m_1+\alpha_1-1)$ of the optical source group having the weight number of 1.

The operations of the k-th decoder 404(k) are as follows.

Firstly, the $S'_k$ and $S_k$ are incremented by 1. Namely, operations $S'_k<==S'_k+1$ and $S_k<==S_k+1$ are performed. Here, the increment of 1 is selected by taking into consideration that the first state of $S'_k$ is 0.

The operations are classified into three cases as follows.

In a first case where $S'_k=S_k$, that is, $Q_k=0$, the optical source on-off control signals $D_k(1:m_k+\alpha_k-1)$ are outputted as the turn-off state.

In a second case where $S'_k<S_k$, among the optical source on-off control signals $D_k(1:m_k+\alpha_k-1)$, the signals $D_k(S'_k)$ to $D_k(S_k-1)$ are outputted as the turn-on state, and the other signals are outputted as the turn-off state.

In a third case where $S'_k>S_k$, among the optical source on-off control signals $D_k(1:m_k+\alpha_k-1)$, the signals $D_k(S'_k)$ to $D_k(m_k+\alpha_k-1)$ and $D_k(1)$ to $D_k(S_k-1)$ are outputted as the turn-on state, and the other signals are outputted as the turn-off state.

As a result, for an arbitrary integer k between 1 to n, by using the modulo adder 402(k) generating the current-period last turn-on boundary position information $S_k$, the register 405(k) generating the last-period last turn-on boundary position information $S'_k$, and the decoder 404(k) generating optical source on-off control information corresponding to the $S_k$ and the $S'_k$, the signal $D_k(1:m_k+\alpha_k-1)$ used to cyclically turn on the number of optical sources which corresponds to the k-th digit information $Q_k$ of the MMRS-notation input electrical signal 307 is generated.

Figure 4B:
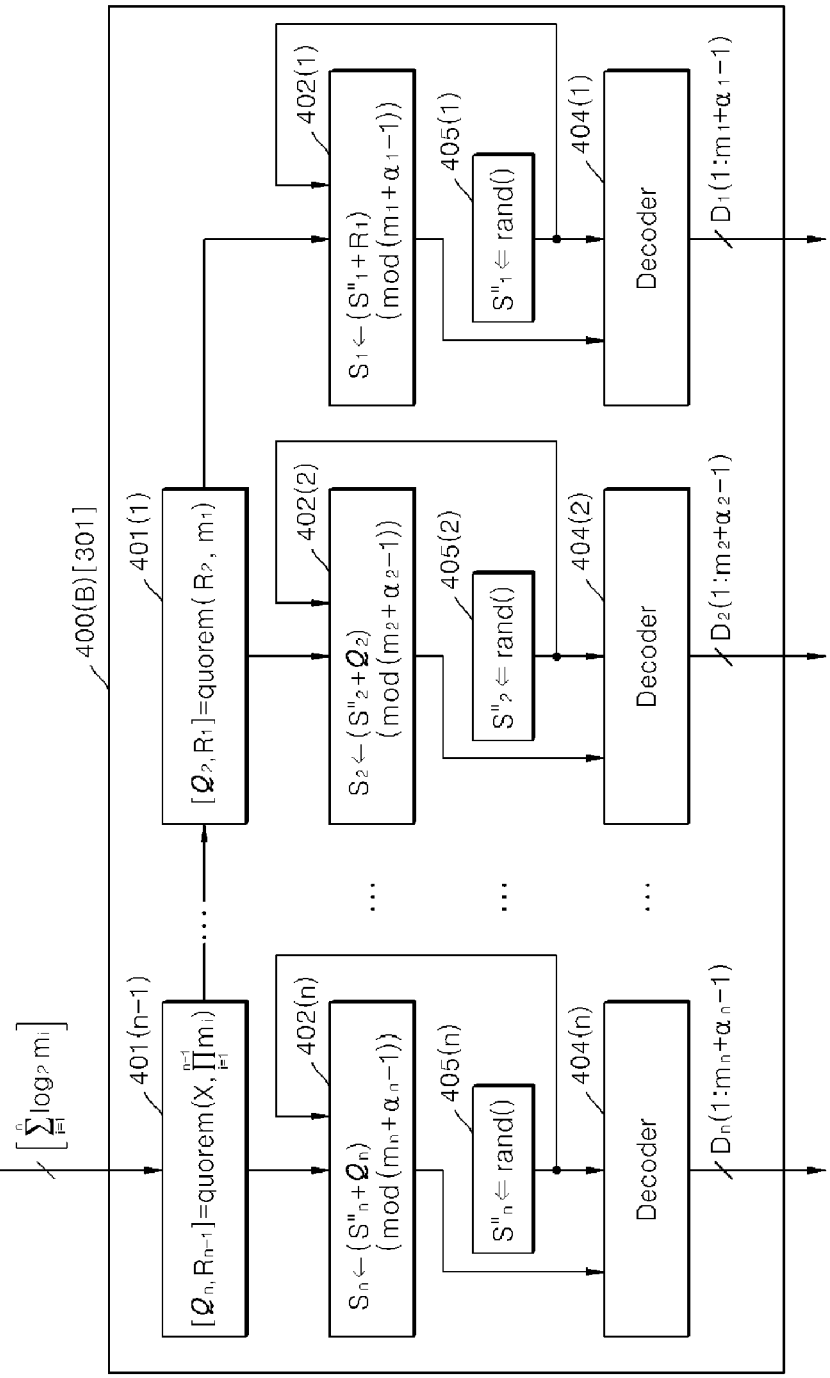

FIG. 4B is a view illustrating the structure of a second-type amplitude-to-array coder used as the amplitude-to-array coder of FIG. 3.

Referring to FIG. 4B, the second-type amplitude-to-array coder 400(B) includes n−1 input converters 401(n−1) to 401 (1), n modulo adders 402(n) to 402(1), n random number generators 405(n) to 405(1), and n decoders 404(n) to 404(1).

In comparison with the aforementioned first-type amplitude-to-array coder 400(A), the second-type amplitude-to-array coder 400(B) includes the n random number generators 405(n) to 405(1) instead of the n registers 403(n) to 403(1). Therefore, in the second-type amplitude-to-array coder 400(B), the current-period first turn-on boundary position information $S'_k$ is selected randomly. Although the names thereof are different, the last-period last turn-on boundary position information $S'_k$ and the current-period first turn-on boundary position information $S'_k$ are substantially identical to each other.

An arbitrary k-th random number generator among the n random number generators 405(n) to 405(1) generates one integer between 0 and $m_k+\alpha_k-2$ with an equal probability every period.

In the second-type amplitude-to-array coder 400(B), for an arbitrary integer k between 1 to n, by using the modulo adder 402(k) generating the current-period last turn-on boundary position information $S_k$, the random number generator 405(k) generating the current-period first turn-on boundary position information $S'_k$, and the decoder 404(k) generating optical source on-off control information corresponding to the $S_k$ and the $S'_k$, the signal $D_k(1:m_k+\alpha_k-1)$ used to turn on the optical sources having optical power intensity $$\prod_{i=1}^{k-1} m_i$$

of which number corresponds to the k-th digit information $Q_k$ of the MMRS-notation input electrical signal 307 is generated in a state having an arbitrary first turn-on position every period.

The aforementioned first-type and second-type amplitude-to-array coders 400(A) and 400(B) operate in a normal state only if the optical power intensities of the optical sources are correctly maintained at specified values of 1, $m_1$, $m_2m_1$, . . .

$$\prod_{i=1}^{k-1} m_i, \ldots, \text{ and } \prod_{i=1}^{n-1} m_i.$$

Namely, the first-type or second-type amplitude-to-array coder 400(A) or 400(B) has no function of avoiding the non-uniformity of the optical power intensities of the optical sources.

Figure 4C:
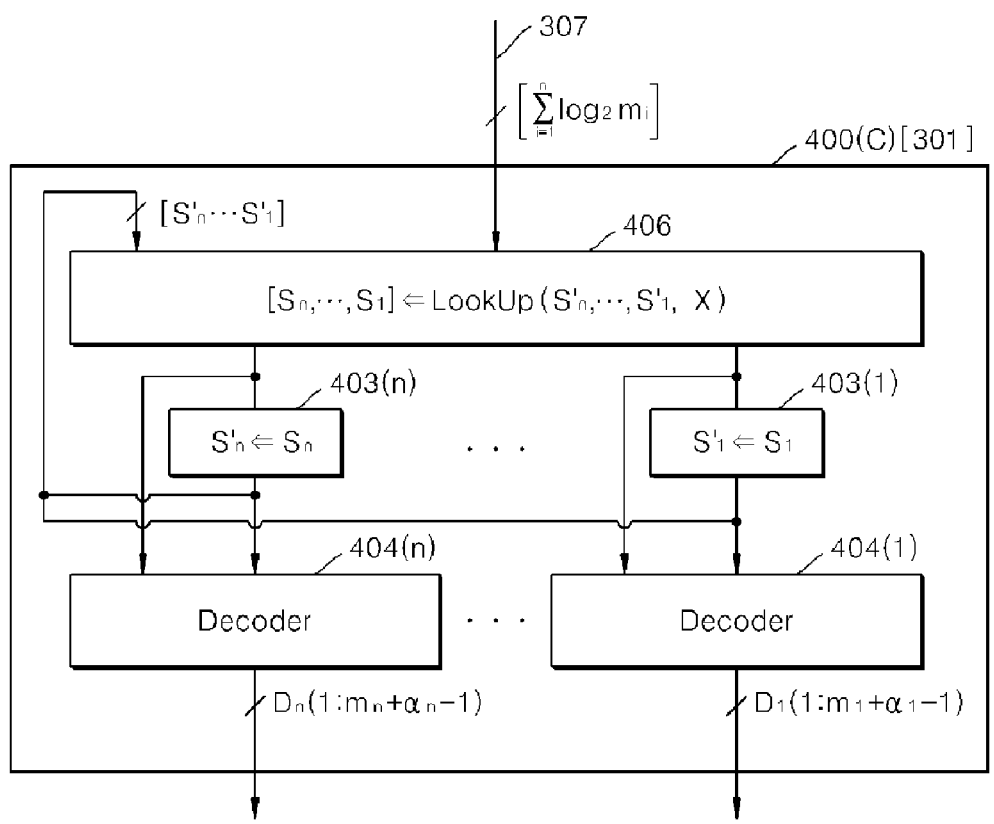

FIG. 4C is a view illustrating the structure of a third-type amplitude-to-array coder used as the amplitude-to-array coder of FIG. 3. Unlike the first-type or second-type amplitude-to-array coder 400(A) or 400(B), the third-type amplitude-to-array coder 400(C) has a function of avoiding the non-uniformity of the optical power intensities of the optical sources.

Referring to FIG. 4C, the third-type amplitude-to-array coder 400(C) includes a lookup unit 406 outputting n last-period last turn-on boundary position information ($S'_n$, . . . , $S'_1$) and n current-period last turn-on boundary position information ($S_n$, . . . , $S_1$) previously stored in an address designated by the input electrical signal 307, n registers 403(n) to 403(1), and n decoders 404(n) to 404(1).

In the third-type amplitude-to-array coder 400(C), operations of the n registers 403(n) to 403(1) and the n decoders 404(n) to 404(1) are equal to those of the first-type amplitude-to-array coder 400(A) of FIG. 4A.

Each of the unit optical sources of the first optical source groups 303(1) to $303(m_k+\alpha_k-1)$ among the MMRR optical source groups of FIG. 3 needs to have a relative optical power intensity of 1. Each of the unit optical sources of the second optical source groups 304(1) to $304(m_2+\alpha_2-1)$ among the MMRR optical source groups needs to have a relative optical power intensity of $m_1$. For an arbitrary integer between 3 to (n-1), each of the unit optical sources of the k-th optical source groups 305(1) to $305(m_k+\alpha_k-1)$ among the MMRR optical source groups needs to have a relative optical power intensity of $$\prod_{i=1}^{k-1} m_i.$$

Finally, each of the unit optical sources of the n-th optical source groups 306(1) to $306(m_n+\alpha_n-1)$ among the MMRR optical source groups needs to have a relative optical power intensity of $$\prod_{i=1}^{n-1} m_i.$$

The optical-wireless transmitter using the first-type or second-type amplitude-to-array coder 400(A) or 400(B) of FIG. 4A or 4B operates normally when the conditions of different optical power intensities are satisfied.

However, due to non-uniformity of a semiconductor material and a process and a difference in cooling capacity according to structures and positions of the optical source, there is slight difference between the optical power intensities of the optical sources.

Therefore, the lookup unit 406 stores optimal current-period last turn-on boundary position information ($S_n$, . . . , $S_1$) so as to adjust optical power intensities corresponding to the input electrical signal 307 according to the current state information of the optical-wireless transmitter based on the previous measurement of the optical power intensities of the optical sources.

The current state information of the optical-wireless transmitter includes the last-period last turn-on boundary position information ($S'_n$, . . . , $S'_1$) stored in the n registers 403(n) to 403(1), the driving power voltages of the optical source drivers 302, the operating temperatures of the optical source groups 303 to 306, and the like. In addition, for the more accurate current state information, other information can be included. The state information is classified in units of a state-duration time, and at time of applying a specific state, the current-period last turn-on boundary position information ($S_n$, . . . , $S_1$) is loaded on the lookup unit 406.

Since the last-period last turn-on boundary position information ($S'_n$, . . . , $S'_1$) is changed every period, the lookup unit 406 needs to store the current-period last turn-on boundary position information ($S_n$, . . . , $S_1$) corresponding to the states of the last-period last turn-on boundary position information ($S'_n$, . . . , $S'_1$). On the other hand, since the driving power voltage information of the optical source drivers 402 is fixed when the optical-wireless transmitter according to the present invention is specified, the optimal current-period last turn-on boundary position information ($S_n$, . . . , $S_1$) according to the change of the driving power voltage can be selected and loaded on the lookup unit 406 at the time of specifying the optical-wireless transmitter.

Since the configuration information of the lookup unit 406 according to the operating temperature information of the MMRR optical source groups 303 to 306 of the optical-wireless transmitter according to the present invention is influenced by the environment, the configuration information of the look unit 406 is previously stored in an auxiliary memory apparatus and loaded on the lookup unit 406 when the operating temperature is changed.

In the third-type amplitude-to-array coder 400(C), the n decoders 404(n) to 404(1) decodes the last-period last turn-on boundary position information $(S'_n, \ldots, S'_1)$ and the optimal current-period last turn-on boundary position information $(S_n, \ldots, S_1)$ output from the lookup unit 406 according to the input electrical signal 307 and the current state information to generate the optical source on-off control signals $D_1(1:m_1+\alpha_1-1)$ to $D_n(1:m_n-\alpha_n-1)$.

In this manner, the third-type amplitude-to-array coder 400(C) has a function of avoiding the non-uniformity of optical power intensities, the non-uniformity of operating powers, and the non-uniformity of operating temperatures of the optical sources.

Figure 4D:
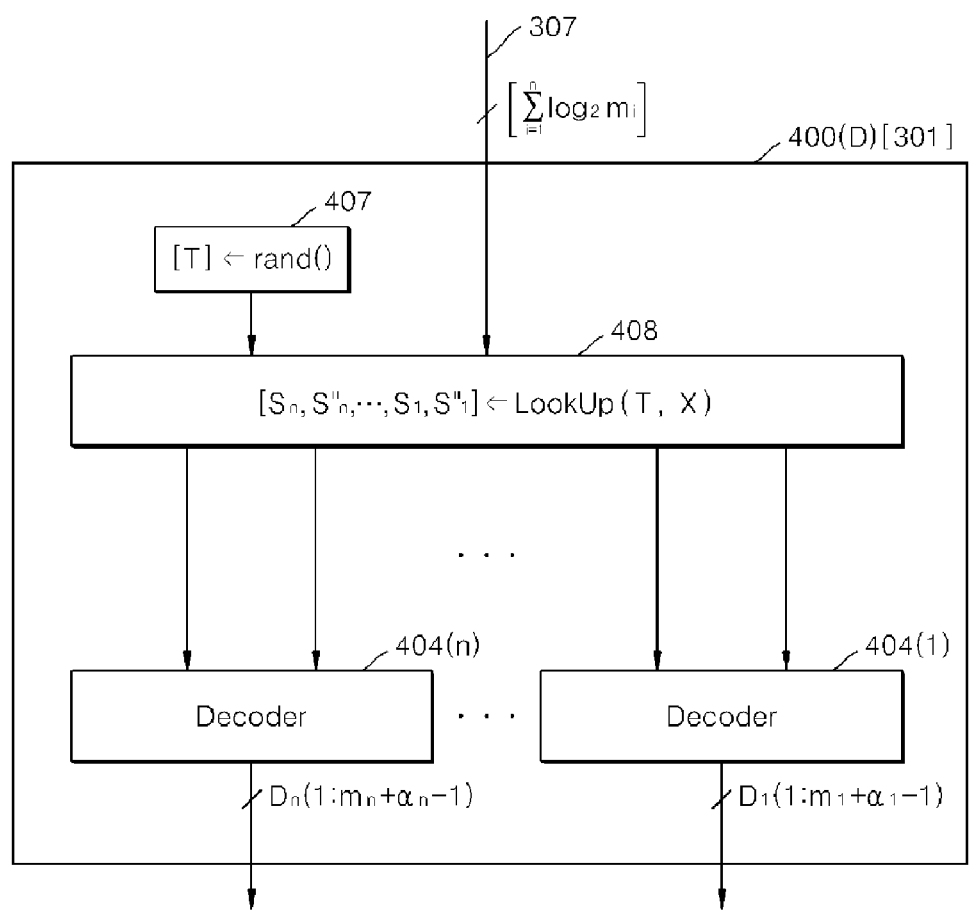

FIG. 4D is a view illustrating the structure of a fourth-type amplitude-to-array coder used as the amplitude-to-array coder of FIG. 3. The fourth-type amplitude-to-array coder 400(C) has a function of avoiding the non-uniformity of the optical power intensities of the optical sources. In addition, the fourth-type amplitude-to-array coder 400(C) includes a simple lookup unit.

Referring to FIG. 4D, the fourth-type amplitude-to-array coder 400(D) includes a random number generator 407 generating an arbitrary integer between 0 to (T−1) with an equal probability every period, a lookup unit 408 outputting n current-period last turn-on boundary position information $(S_n, \ldots, S_1)$ and n current-period first turn-on boundary position information $(S''_n, \ldots, S''_1)$ previously stored in an address designated by an output of the random number generator 407 and the input electrical signal 307, and n decoders 404(n) to 404(1). In the fourth-type amplitude-to-array coder 400(D), operations of the n decoders 404(n) to 404(1) are equal to those of the first-type amplitude-to-array coder 400 (A).

An output range T of the random number generator 407 is a constant determined according to engineering parameters for the optical-wireless transmitter according to the present invention. In the fourth-type amplitude-to-array coder 400 (D), the random number generator 407 performs operations corresponding to the operations of the n registers 403(n) to 403(1) of the third-type amplitude-to-array coder 400(C) which output the last-period last turn-on boundary position information $(S'_n, \ldots, S'_1)$. Namely, the random number generator 407 can be replaced with an arbitrary apparatus which can output an integer between 0 and (T−1) uniformly. For example, the random number generator T can be replaced with a modulo-T counter.

In the third-type amplitude-to-array coder 400(C), a large-sized storage apparatus is used for the lookup unit so as to store various state information. However, in the fourth-type amplitude-to-array coder 400(D), an information storage apparatus having an address size of a variable T is used for the lookup unit, and the variable T is uniquely determined.

In the fourth-type amplitude-to-array coder 400(D), a lookup information configuration method of the lookup unit 408 is similar to that of the lookup unit 406 of the third-type amplitude-to-array coder 400(D), but the current-period first turn-on boundary position information $(S''_n, \ldots, S''_1)$ and the current-period last turn-on boundary position information $(S_n, \ldots, S_1)$ need to be simultaneously configured.

Figure 5A:
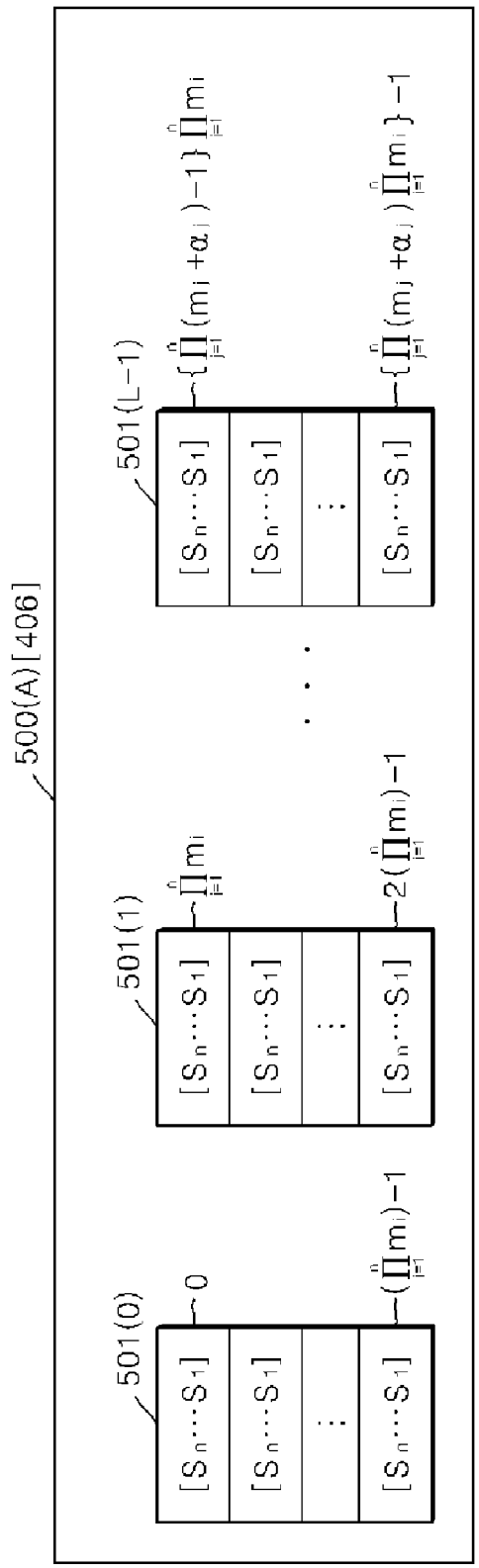

FIG. 5A is a view illustrating a configuration of a memory map of the lookup unit of FIG. 4C, according to an embodiment of the present invention.

Referring to FIG. 5A, a lookup memory 500(A) includes L lookup memory pages 501(0) to 501(L−1). In a case where the last-period last turn-on boundary position information $(S'_n, \ldots, S'_1)$ is used as the state information for lookup, the number L is determined as $$\prod_{j=1}^{n}(m_j + \alpha_j)$$

based on a size of the input electrical signal X and the number of optical sources.

A memory space for one page is determined according to the dynamic range of the input electrical signal X. The first lookup memory page 501(0) has $$\prod_{i=1}^{n} m_i$$

rows, and each row stores the current-period last turn-on boundary position information $(S_n, \ldots, S_1)$ corresponding to a specific input electrical signal. For example, with respect to the information stored in the 0-th row of the first lookup memory page 501(0), in a case where the last-period last turn-on boundary position information $(S'_n, \ldots, S'_1)$ are $(0, \ldots, 0)$ and the size of the input electrical signal 307 is 0, the current-period last turn-on boundary position information $(S_n, \ldots, S_1)$ become $(0, \ldots, 0)$, which is the same as the last-period last turn-on boundary position information $(S_n, \ldots, S_1)$.

The address of the last row of the first lookup memory page 501(0) is $$\prod_{i=1}^{n} m_i - 1,$$

in which the current-period last turn-on boundary position information $(S_n, \ldots, S_1)$ used to provide the optical power intensity closest to the maximum value $$\prod_{i=1}^{n} m_i - 1$$

of the input electrical signal is stored.

Each of the second to last lookup memory pages 501(1) to 501(L−1) has $$\prod_{i=1}^{n} m_i$$

rows, and each row stores the current-period last turn-on boundary position information $(S_n, \ldots, S_1)$ according to the same principle as that of the first lookup memory page 501(0).

FIG. 5B is a view illustrating a configuration of a memory map of the lookup unit of FIG. 4D, according to an embodiment of the present invention.

Referring to FIG. 5B, a lookup memory 500(B) includes T lookup memory pages 502(0) to 502(T−1). The number T is a variable determined based on driving loads of the optical sources at the time of implementation of the optical-wireless transmitter according to the present invention. The page configuration method of the lookup memory 500(B) is the same as that of the lookup memory 500(A) of FIG. 5B except that the information to be looked up and outputted is constructed with the last-period last turn-on boundary position information ($S''_n, \ldots, S''_1$) and the current-period first turn-on boundary position information ($S''_n, \ldots, S''_1$).

Since the number T of the lookup memory pages can be arbitrarily selected, the lookup memory 500(B) can be constructed with a relatively small number of lookup memory pages in comparison with the lookup memory 500(A) of FIG. 5A.

In an optical-wireless transmitter according to the present invention, a large number of optical sources and drivers can be connected by using a small number of connection terminals and lines, so that it is possible to implement an inexpensive optical-wireless transmitter having a simple structure.

In addition, in an optical-wireless transmitter according to the present invention, an arbitrary analog optical power can be generated by only turning on and off optical sources having various optical power intensities, so that it is possible to implement a high-power efficiency optical-wireless transmitter.

In addition, according to the present invention, even in case of using a plurality of optical sources having non-uniform optical power characteristics, it is possible to implement an optical-wireless transmitter having a linear operation characteristic.

While the present invention has been particularly shown and described with reference to exemplary embodiments thereof, it will be understood by those skilled in the art that various changes in form and details can be made therein without departing from the spirit and scope of the present invention as defined by the appended claims.

INDUSTRIAL APPLICABILITY

The present invention relates to an optical communication apparatus, and more particularly, to an optical wireless transmitter capable of transmitting optical signals with high power efficiency. In an optical-wireless transmitter according to the present invention, a large number of optical sources and drivers can be connected by using a small number of connection terminals and lines, so that it is possible to implement an inexpensive optical-wireless transmitter having a simple structure.

The invention claimed is:

1. A high power efficiency optical wireless transmitter comprising:
   an amplitude-to-array coder converting an amplitude of an electric signal input from a baseband modulator into optical source control signals so as to generate a optical output power corresponding to the electric signal;
   optical source driver groups driving optical sources based on the optical source control signals of the amplitude-to-array coder; and
   MMRS (modified mixed radix system) or MMRR (modified mixed radix system with Redundancy) optical source group driven by the optical source driver groups to generate various optical power intensities,
   wherein the MMRS optical source group includes n optical source groups,
   wherein a first optical source group of the n optical source groups includes $m_1 - 1$ first unit optical sources, and a relative optical power intensity of the first unit optical sources is 1,
   wherein a second optical source group of the n optical source groups includes $m_2 - 1$ second unit optical sources, and a relative optical power intensity of the second unit optical sources is $m_1$,
   wherein a k-th optical source group of the n optical source groups includes $m_k - 1$ k-th unit optical sources, and a relative optical power intensity of the k-th unit optical sources is $$\prod_{i=1}^{k-1} m_i,$$

wherein an n-th optical source group of the n optical source groups includes $m_n - 1$ n-th unit optical sources, and a relative optical power intensity of the n-th unit optical sources is $$\prod_{i=1}^{n-1} m_i,$$

and
   wherein n, $m_1$, $m_2$, $m_k$, and $m_n$ are arbitrary natural numbers, and the MMRS optical source group generates the optical power intensities having arbitrary integers ranging from 0 to $$\left( \prod_{i=1}^{n} m_i - 1 \right)$$

by controlling on-off of the unit optical sources.

2. A high power efficiency optical wireless transmitter comprising:
   an amplitude-to-array coder converting an amplitude of an electric signal input from a baseband modulator into optical source control signals so as to generate a optical output power corresponding to the electric signal;
   optical source driver groups driving optical sources based on the optical source control signals of the amplitude-to-array coder; and
   MMRS (modified mixed radix system) or MMRR (modified mixed radix system with Redundancy) optical source group driven by the optical source driver groups to generate various optical power intensities,
   wherein the MMRR optical source groups include n optical source groups,
   wherein a first optical source group of the n optical source groups includes $m_1 + \alpha_1 - 1$ first unit optical sources, and a relative optical power intensity of the first unit optical sources is 1,
   wherein a second optical source group of the n optical source groups includes $m_2 + \alpha_2 - 1$ second unit optical sources, and a relative optical power intensity of the second unit optical sources is $m_1$,
   wherein a k-th optical source group of the n optical source groups includes $m_k + \alpha_k - 1$ k-th unit optical sources, and a relative optical power intensity of the k-th unit optical sources is $$\prod_{i=1}^{k-1} m_i,$$

wherein an n-th optical source group of the n optical source groups includes $m_n+\alpha_n-1$ n-th unit optical sources, and a relative optical power intensity of the n-th unit optical sources is $$\prod_{i=1}^{n-1} m_i,$$

and wherein n, $m_1$, $m_2$, $m_k$, $m_n$, $\alpha_1$, $\alpha_2$, $\alpha_k$, and $\alpha_n$ are arbitrary natural numbers, and the MMRR optical source group generates the optical power intensities having arbitrary integers ranging from 0 to $$\left(\prod_{i=1}^{n} m_i - 1\right)$$

by controlling on-off of the unit optical sources.

3. The high power efficiency optical wireless transmitter of claim 2, wherein the number of connection lines between the MMRS or the MMRR optical source group and drivers driving the MMRS or the MMRR optical source group is exponentially decreased in comparison with an optical wireless transmitter using individually-driven optical sources.

4. The high power efficiency optical wireless transmitter of claim 2, each unit optical source of each optical source group is constructed by connecting unit optical sources in parallel, in series, or both in parallel and in series.

5. The high power efficiency optical wireless transmitter of claim 2, wherein the amplitude-to-array coder which generates the optical source control signals used to drive the MMRS or MMRR optical source group comprises:

n−1 input converters converting the electric signal to an MMRS-notation electric signal;

n modulo adders calculating current-period last turn-on boundary position information ($S_n$, . . . , $S_1$) of the MMRS-notation electric signal based on digit information ($Q_n$, . . . , $Q_2$, $R_1$) and last-period last turn-on boundary position information ($S'_n$, . . . , $S'_1$) of the MMRS-notation electric signal;

n registers storing the current-period last turn-on boundary position information; and n decoders generating the optical source control signals used to control the on-off of the unit optical sources based on the current-period last turn-on boundary position information and the last-period last turn-on boundary position information.

6. The high power efficiency optical wireless transmitter of claim 5, wherein each modulo adder calculates the current-period last turn-on boundary position information by using a modulo addition method, and wherein the modulo addition method is a method of adding last-period last turn-on boundary position information ($S'_k$) to the digit information ($Q_k$ or $R_1$) of the electric signal, diving the result by the number ($m_k+\alpha_k-1$) of unit optical sources of each digit to obtain a remainder, and inputting the remainder to the current-period last turn-on boundary position information ($S_k$).

7. The high power efficiency optical wireless transmitter of claim 2, wherein the amplitude-to-array coder which generates the optical source control signals used to drive the MMRS or MMRR optical source group comprises:

n−1 input converters converting the electric signal to an MMRS-notation electric signal;

n modulo adders calculating current-period last turn-on boundary position information ($S_n$, . . . , $S_1$) of the MMRS-notation electric signal based on digit information ($Q_n$, . . . , $Q_2$, $R_1$) and current-period first turn-on boundary position information ($S''_n$, . . . , $S''_1$) of the MMRS-notation electric signal;

n random number generators generating the current-period first turn-on boundary position information;

n decoders generating the optical source control signals used to control the on-off of the unit optical sources based on the current-period last turn-on boundary position information and the current-period first turn-on boundary position information.

8. The high power efficiency optical wireless transmitter of claim 7, wherein each modulo adder calculates the current-period last turn-on boundary position information by using a modulo addition method, and wherein the modulo addition method is a method of adding current-period first turn-on boundary position information ($S''_k$) to the digit information ($Q_k$ or $R_1$) of the electric signal, diving the result by the number ($m_k+\alpha_k-1$) of unit optical sources of each digit to obtain a remainder, and inputting the remainder to the current-period last turn-on boundary position information ($S_k$).

9. The high power efficiency optical wireless transmitter of claim 2, wherein the amplitude-to-array coder which generates the optical source control signals used to drive the MMRS or MMRR optical source group comprises:

a lookup unit outputting current-period last turn-on boundary position information ($S_n$, . . . , $S_1$) previously stored in an information storage designated by the electrical signal and last-period last turn-on boundary position information ($S'_n$, . . . , $S'_1$);

n registers storing the current-period last turn-on boundary position information; and n decoders generating the optical source control signals used to control the on-off of the unit optical sources based on the current-period last turn-on boundary position information and the last-period last turn-on boundary position information.

10. The high power efficiency optical wireless transmitter of claim 9, wherein the number of lookup memory pages of the lookup unit is determined by the electrical signal and the number of optical sources, wherein a memory space of each lookup memory page is determined by a dynamic range of the electrical signal, and wherein each lookup memory page has $$\prod_{i=1}^{n} m_i$$

rows, and each row stores the current-period last turn-on boundary position information $(S_n, \ldots, S_1)$.

11. The high power efficiency optical wireless transmitter of claim 9, wherein the lookup unit outputs optimal current-period last turn-on boundary position information $(S_n, \ldots, S_1)$ by using driving power voltage information of the optical source drivers and temperature information of the optical source groups.

12. The high power efficiency optical wireless transmitter of claim 11, wherein the driving power voltage information is fixed when the high power efficiency optical-wireless transmitter is set, and wherein the temperature information of the optical source groups is stored in an auxiliary memory apparatus and loaded on the lookup unit when an operating temperature is changed.

13. The high power efficiency optical wireless transmitter of claim 2, wherein the amplitude-to-array coder which generates the optical source control signals used to drive the MMRS or MMRR optical source group comprises:

a random number generator generating signals (0~T−1) determining a lookup starting position;

a lookup unit outputting current-period last turn-on boundary position information $(S_n, \ldots, S_1)$ and current-period first turn-on boundary position information $(S''_n, \ldots, S''_1)$ previously stored in an information storage designated by the electrical signal and the signals (0~T−1) determining the lookup starting position; and n decoders generating the optical source control signals used to control the on-off of the unit optical sources based on the current-period last turn-on boundary position information and the current-period first turn-on boundary position information.

14. The high power efficiency optical wireless transmitter of claim 13, wherein the number of lookup memory pages of the lookup unit is T, wherein a memory space of each lookup memory page is determined by a dynamic range of the electrical signal, and wherein each lookup memory page has $$\prod_{i=1}^{n} m_i$$

rows, and each row stores the current-period last turn-on boundary position information $(S_n, \ldots, S_1)$ and the current-period first turn-on boundary position information $(S''_n, \ldots, S''_1)$.

15. The high power efficiency optical wireless transmitter of claim 13, wherein the random number generator is an apparatus equally outputting an integer ranging from 1 to T−1.

* * * * *